(12) United States Patent
Delmaere et al.

(10) Patent No.: US 9,939,939 B2
(45) Date of Patent: Apr. 10, 2018

(54) INTERFACE MODULE

(71) Applicant: DAV, Créteil (FR)

(72) Inventors: Christophe Delmaere, Créteil (FR); Eric Damian, Créteil (FR); Laurent Lucaora, Créteil (FR)

(73) Assignee: DAV, Créteil (FR)

( * ) Notice: Subject to any disclaimer, the term of this patent is extended or adjusted under 35 U.S.C. 154(b) by 32 days.

(21) Appl. No.: 14/781,062

(22) PCT Filed: Mar. 28, 2014

(86) PCT No.: PCT/FR2014/000067
§ 371 (c)(1),
(2) Date: Sep. 29, 2015

(87) PCT Pub. No.: WO2014/154956
PCT Pub. Date: Oct. 2, 2014

(65) Prior Publication Data
US 2016/0062526 A1 Mar. 3, 2016

(30) Foreign Application Priority Data

Mar. 29, 2013 (FR) .................................... 13 00735

(51) Int. Cl.
*G06F 3/041* (2006.01)
*G06F 1/16* (2006.01)

(52) U.S. Cl.
CPC .......... *G06F 3/0412* (2013.01); *G06F 1/1601* (2013.01); *G06F 2203/04103* (2013.01)

(58) Field of Classification Search
CPC ......... G06F 3/0412; G06F 2203/04103; G06F 1/1601

USPC .............. 345/87, 102, 156–184; 235/472.01; 361/690; 715/700; 455/566
See application file for complete search history.

(56) References Cited

U.S. PATENT DOCUMENTS

| 4,728,936 A * | 3/1988 | Guscott ................. G08B 25/14 340/525 |
| 4,755,909 A * | 7/1988 | Hibbert ................. H01H 9/104 200/308 |
| 5,155,659 A * | 10/1992 | Kunert ................. G06F 3/0238 220/375 |
| 5,767,447 A * | 6/1998 | Dudderar ............... H01L 23/04 174/546 |

(Continued)

FOREIGN PATENT DOCUMENTS

CN 102494275 A 6/2012
DE 202007018313 U1 6/2008
(Continued)

OTHER PUBLICATIONS

International Search Report issued in corresponding application No. PCT/FR2014/000067 dated Oct. 2, 2014 (3 pages).

*Primary Examiner* — Prabodh M Dharia
(74) *Attorney, Agent, or Firm* — Osha Liang LLP

(57) ABSTRACT

An interface module includes a touchpad that is transparent and able to detect a user's press, a display screen, disposed behind and cooperating with the touchpad to form a touch screen, and a front frame including an exterior periphery and an internal rim, delimiting in the interior space of the front frame a front housing and a rear housing. The touchpad is disposed inside the front housing and the display screen is disposed inside the rear housing.

20 Claims, 2 Drawing Sheets

(56) References Cited

U.S. PATENT DOCUMENTS

Figure 1:
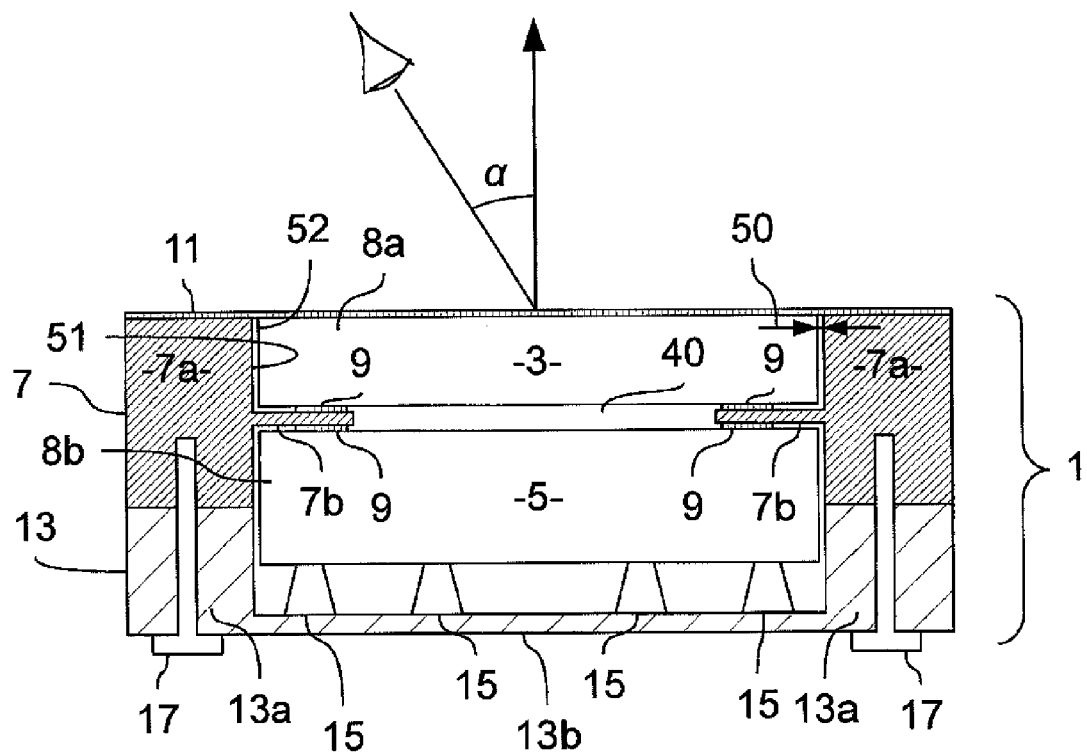

| | | | |
|---|---|---|---|
| 6,532,152 B1 | 3/2003 | White et al. | |
| 6,912,122 B2* | 6/2005 | Chen | G06F 1/162 248/917 |
| 7,446,753 B2* | 11/2008 | Fitch | G06F 1/1626 345/156 |
| 7,940,287 B2* | 5/2011 | Kim, II | G02F 1/133308 345/102 |
| 2006/0054704 A1* | 3/2006 | Fitch | G06F 1/1626 235/472.01 |
| 2008/0048958 A1* | 2/2008 | Kim, II | G02F 1/133308 345/87 |
| 2008/0270899 A1* | 10/2008 | Duncan | G06F 1/1616 715/700 |
| 2009/0079698 A1* | 3/2009 | Takashima | G06F 3/0224 345/169 |
| 2009/0219255 A1* | 9/2009 | Woolley | G06F 3/0416 345/173 |
| 2010/0270052 A1* | 10/2010 | Crohas | B29C 45/14 174/50 |
| 2010/0279740 A1* | 11/2010 | Lee | G06F 1/3203 455/566 |
| 2011/0045392 A1* | 2/2011 | Lemmer | H01L 51/5048 430/56 |
| 2011/0228191 A1 | 9/2011 | Hsu et al. | |
| 2012/0218219 A1* | 8/2012 | Rappoport | H01L 27/3276 345/174 |
| 2013/0027892 A1* | 1/2013 | Lim | H04M 1/185 361/748 |
| 2013/0058039 A1* | 3/2013 | Lee | H04M 1/0202 361/690 |
| 2014/0029207 A1* | 1/2014 | Beraud | B60K 37/06 361/728 |
| 2014/0085258 A1* | 3/2014 | Beraud | B60K 37/00 345/174 |
| 2014/0340824 A1* | 11/2014 | Chen | H04M 1/0266 361/679.3 |
| 2016/0116947 A1* | 4/2016 | Matsuoka | G06F 1/1675 361/679.55 |

FOREIGN PATENT DOCUMENTS

| | | |
|---|---|---|
| EP | 1879363 A2 | 1/2008 |
| EP | 2390692 A1 | 11/2011 |
| JP | 2002132181 A | 5/2002 |
| JP | 2003233059 A | 8/2003 |
| WO | WO2012131192 A1 * | 4/2012 |
| WO | 2012131188 A1 | 10/2012 |

* cited by examiner

INTERFACE MODULE

The present invention relates to an interface module, particularly for the interior of a motor vehicle and for controlling the functions thereof, more particularly with a touch screen.

In order to control the functions of a vehicle, such as the navigation assistant, the interior illumination, the air conditioning or the car radio, it is known practice to use interface modules that employ a pressure sensor such as a touchpad.

Said touchpad is advantageously coupled to a display screen that is visible through said touchpad so as to form an interface module known as a touch screen.

In said touch screens, the spacing between the touchpad and the display screen on which it is superposed dictates the quality of the display module obtained.

The greater said spacing, the greater the risk that, when viewed at an oblique angle, the selection zones to be displayed on the screen will no longer correspond to the actual zones operated by pressure on the touchpad. Furthermore, during said viewing from an oblique angle, the user is likely to be able to see unattractive technical parts.

The undesirable effects of image fuzziness also increase with said spacing.

In order at least partially to alleviate the defects mentioned hereinabove, the subject of the invention is an interface module comprising:
- a transparent touchpad, able to detect a press by a user,
- a display screen, positioned behind the touchpad and collaborating with said touchpad to form a touch screen,
- a frontal surround comprising an exterior periphery and an internal rim, delimiting in the interior space of the frontal surround a front housing and a rear housing,
- the touchpad is positioned inside the front housing and the display screen is positioned inside the rear housing.

This setup notably makes it possible to control the space between said touchpad and said screen while at the same time assembling the touch screen into an element that can easily be handled for the remainder of the assembly.

The interface module according to the invention may further have one or more of the following features, considered alone or in combination.

The touchpad and the display screen are held against the internal rim by bonding.

Nonlimitingly, this means of bonding may be a double-sided adhesive, a UV-sensitive adhesive or even a silicone-based adhesive.

In order to obtain a good seal, the bonding means will preferably be a bead of silicone.

The frontal surround may be made of magnesium.

The use of magnesium allows good control over the critical dimensions which make it possible to obtain an interface offering a good level of quality. Thus, the use of magnesium makes it possible to obtain an internal rim of very small thickness while at the same time offering enough rigidity for good overall mechanical cohesion. The small thickness of the internal rim means that the spacing between the screen and the touchpad can be minimized and that, in this way, the quality of the optical system formed by the touchpad and the screen can be increased.

The thickness of the internal rim is comprised within a range extending from 0.35 to 0.5 mm.

For preference, the thickness of the internal rim is 0.4 mm.

There is a gap between the exterior periphery of the touchpad and the interior face of the exterior periphery of the surround that accommodates it.

The use of magnesium also makes it possible to control the dimensioning of the exterior periphery of the surround that accommodates the touchpad so that the gap, situated between the exterior periphery of the surround and the touchpad, is as even as possible.

The length of this gap is comprised within a range extending from 0.7 to 0.9 mm.

For preference, the length of this gap is 0.8 mm.

The use of magnesium also makes it possible to obtain a very good quality surface finish at the exterior part of the surround visible to the user. Thus, there will be no or very little apparent discontinuity at the gap between the surround and the touchpad when this zone is covered, for example, with a polarizing film. The use of magnesium thus makes it possible to obtain a control façade of the "flush" type, which means to say one that is smooth with no apparent raised surround delineating the outline of the screen.

The frontal surround is electrically grounded.

The use of a magnesium surround also makes it possible to afford the touchpad, the screen and the electronics good protection against electrostatic discharge (ESD). To do that, all that is required is for the frontal surround to be connected to the ground potential of the interface module, a solution that is inconceivable if the surround is made of plastic.

To control the dimensioning and achieve a good quality surface finish, the magnesium surround will preferably be produced using an injection molding technique.

The touchpad is covered with a polarizing film forming the frontal surface of the interface module, said polarizing film furthermore being bonded to the periphery of the frontal surround so as to close the front housing. The film thus closes the front housing and forms a frontal surface that furthermore can easily be decorated by screen printing.

It further comprises a casing back, closing the rear housing and comprising deformable protrusions on a casing-back surface of the back closing said rear housing.

It comprises fixings passing through the casing back and engaging with the periphery of the frontal surround to compress the protrusions and fix the frontal surround to the casing back. Under the effect of the tightening, the protrusions are compressed thus absorbing assembly clearances and reducing noise when the interface module is subjected to vibrations.

The fixings, for example, comprise self-tapping screws passing through the casing back and engaging with the periphery of the frontal surround.

It may further comprise:
- a printed circuit positioned in the rear housing,
- a printed circuit forming an electronic interface between the touchpad and the display screen and positioned in the rear housing,
- a plate, arranged behind the display screen and fixed to said display screen by second fixings,
- said plate may be positioned between the display screen and the printed circuit,
- said plate comprises positioning means acting as supports for the printed circuit. By way of nonlimiting example, these positioning means are pressed studs made from said plate.

The metal plate notably allows the screen to be positioned in the interface module in a firm and compact manner.

Said plate may engage with fixings used for the casing back and frontal surround. Engagement of the plate with the fixings reinforces the structure of the interface module, particularly with regard to vibrations.

The plate may be a pressed and cut aluminum plate. Aluminum is a lightweight and readily deformable metal; pressing and cutting techniques are rapid and offer good geometric precision.

The pressed studs may be positioned facing the protrusions of the casing back. Thus, the protrusions and the pressed studs trap the printed circuit without applying force that might deform or break said printed circuit.

Figure 2:
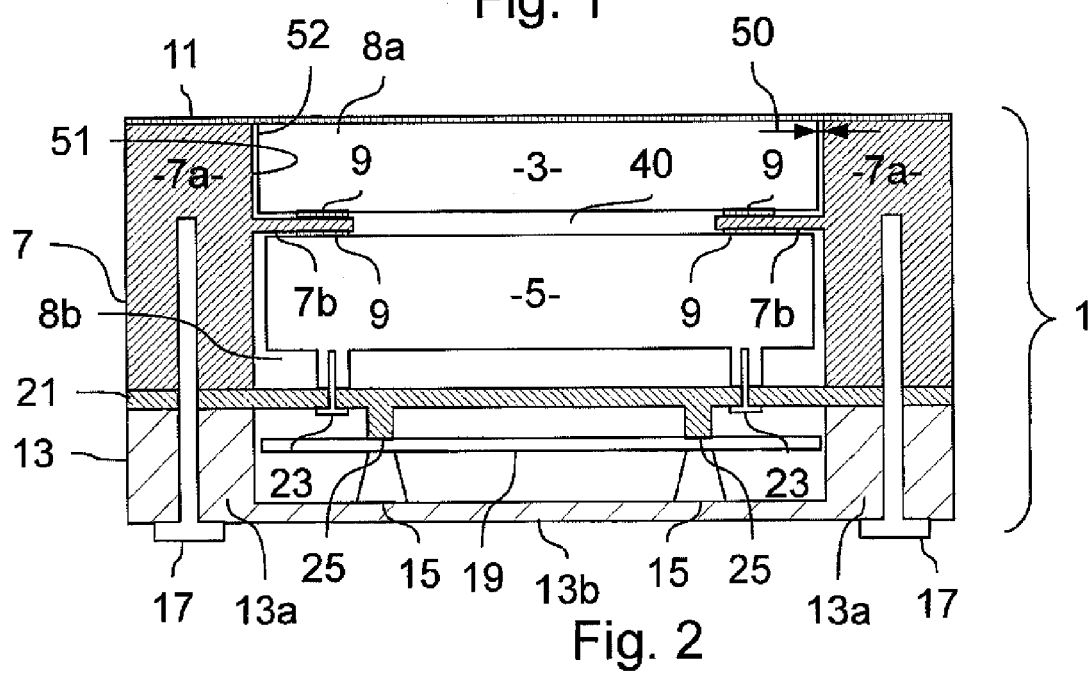
Figure 3A:
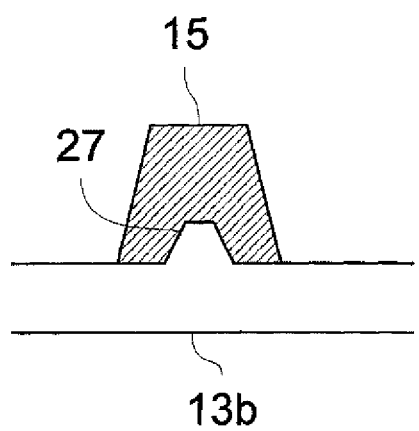
Figure 3B:
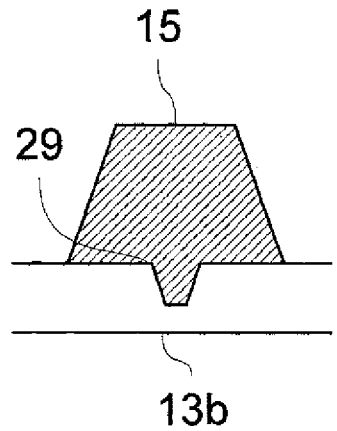
Figure 3C:
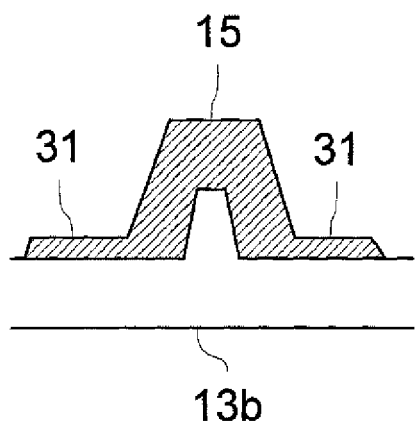

Further features and advantages of the invention will become more clearly apparent from reading the following description, given by way of nonlimiting illustrative example, and from studying the attached drawings among which:

FIG. 1 schematically depicts an interface module according to a first embodiment of the invention, FIG. 2 schematically depicts an interface module according to a second embodiment of the invention, and FIGS. 3a, 3b, 3c show in greater detail a portion of a casing back for an interface module according to the invention.

In all the figures, the same references relate to the same elements.

FIG. 1 schematically shows an interface module according to one particular embodiment of the invention.

The interface module 1 here comprises a touchpad 3 which is transparent and placed in front of a display screen 5.

The notions of "in front of", "behind", "frontal", "rear" etc. are considered with respect to the normal to the surface of the interface module 1 as presented to the user and facing toward the user, said surface then being the forwardmost frontal surface.

The touchpad 3 is configured to detect a press by a user, particularly in the context of navigating through a menu displayed on the display screen 5, for example for controlling vehicle functions such as the air conditioning, a car radio and/or the navigation assistant.

The touch-sensitive surface 3 and the display screen 5 thus collaborate to form a touch screen.

The technology employed in the touchpad 3 may for example be resistive or capacitive and the display screen 5 may be produced in the form of a liquid crystal display (LCD) screen or an LED (TFT) display screen.

The interface module 1 comprises a frontal surround 7, comprising a periphery 7a forming the exterior surround for the interface module 1.

The interior surface of the frontal surround 7 carries an internal rim 7b delimiting, in the interior space of the frontal surround 7, two housings, these respectively being a front housing 8a and a rear housing 8b.

The touchpad 3 is positioned in the front housing 8a, and the display screen 5 is positioned in the rear housing 8b. In particular, the touchpad 3 and the display screen 5 may be bonded to the internal rim 7b for example by means of a thin bead of silicone 9 which also acts as a seal.

In that way, the spacing between the touchpad 3 and the display screen 5 is reduced to the combined thickness of the internal rim 7b and of the two beads of silicone 9. The thickness of the bead of silicone 9 self-adjusts during assembly so as to absorb some of the variations on the dimensions of the components of the interface module 1.

The silicone used is recommended for this use in that it allows the space between the rear surfaces of the touchpad 3 and the front surface of the display screen 5 to be closed in a sealed manner. That prevents fogging of said surfaces thus preventing fuzziness of the information displayed on the display screen 5.

Furthermore, silicone offers the advantage over, notably, foams, that it can be compressed down to a far smaller thickness without losing its adhesive, sealing and elasticity properties. This means that the spacing between the touchpad 3 and the underlying display screen 5 can be reduced still further.

The touchpad 3 and the display screen 5 which have been bonded to the frontal surround 7 form an element that can easily be handled while the interface module 1 is being assembled.

The frontal surround 7 is advantageously made of magnesium, which notably makes it possible to obtain a thickness of the internal rim 7b that is very thin, namely comprised in a range of values extending from 0.35 to 0.5 mm. For preference, the thickness of the internal rim is 0.4 mm. This thin thickness of the internal rim is obtained because of the precision of magnesium machining or injection molding techniques.

The surface of the frontal surround 7 is advantageously covered with a thin coat of dark lacquer, on the one hand preventing said frontal surround 7 from corroding and, on the other hand, making said frontal surround 7 discreet or even unnoticeable when the display screen 5 is switched off. Said fine coat is, for example, applied using electrophoresis.

The interface module 1 may comprise a polarizing film 11 covering the upper surface of the touchpad 3 and bonded to the front face of the periphery 7a of the frontal surround 7 so as to close the front housing 8a containing the touchpad 3. The polarizing film 11 thus allows the touchpad 3 to be isolated from the external elements such as moisture and dust, while at the same time offering better visibility.

At the time of assembly, the bead of silicone 9 situated between the internal rim 7b and the touchpad 9 is compressed until the upper part of the touchpad and the upper part of the periphery 7a of the frontal surround 7 lie in the same plane.

The polarizing film 11 that covers both the touchpad and the upper part of the periphery 7a is then flat and can easily and esthetically be incorporated into, for example, a vehicle interior. To do that, the polarizing film 11 may be decorated, particularly by screen printing, for example by printing a surround delimiting the touch screen obtained by the superposing of the touchpad 3 and the display screen 5.

By selecting for the frontal surround 7 and the screen printed surround of the polarizing film 11 a color that is black or, more generally, dark, corresponding to the color of the display screen 5 when switched off, said frontal surround 7 and the screen printed surround are relatively indistinguishable from the display screen 5 when it is switched off, thus improving the integration of the interface module into the interior.

The interface module also comprises a casing back 13, forming the rear façade of the interface module 1 and closing the rear housing 8b. The casing back 13 may in particular be produced by molding a plastic, polymer or composite, for example a polycarbonate/acrylonitrile-butadiene-styrene (PC/ABS) compound.

Said casing back 13 in particular comprises protrusions, here in the form of spikes 15 which are elastically deformable, on that surface of its back that faces the rear housing 8b.

These spikes 15 are, at the time of assembly, compressed here against the display screen 5, making it possible at least partially to compensate for variations in the dimensions of the elements in the rear housing 8b.

The compressed spikes 15 also absorb some of the vibrations to which the components of the interface module 1 may be subjected.

The casing back 13 embodiment of FIG. 1 here comprises a casing-back periphery 13a and a casing-back surface 13b. The interface module 1 comprises fixings 17 for the casing-back periphery 13a, in this instance screws and pre-drilled holes for the passage of said screws through the casing back 13, collaborating with forced engagement with the frontal surround 7.

As an alternative, the fixings 17 may comprise for example rivets or headed stakes.

These fixings 17 allow the spikes 15 to be compressed by clamping against the display screen 5 situated in front of them, in this instance the display screen 5, so as to at least partially compensate for variations in the dimensions of the elements positioned in the rear housing 8b.

The interface module 1 thus obtained is easily assembled, robust and at least some of the variations in the strings of dimensions are compensated for. In particular, elements with greater variation on their dimensions, and which are therefore potentially less expensive to produce, can be used without this resulting in greater amounts of play.

Furthermore, the space 40 between the touchpad 3 and the display screen is small, making it possible to lessen the effects of fuzziness caused by this spacing, and making it possible to widen the maximum viewing angle α formed between the touch-sensitive input field and the displayed field.

The viewing angle α is defined here as the axis of viewing of an observer with respect to the normal to the frontal surface of the interface module 1.

Finally, by suitably sizing the screen printed surround on the polarizing film it is possible, because of the small amount of space 40 between the touchpad 3 and the display screen 5 to ensure that, even at a relatively large (30° to 45°) viewing angle α, few, if any, of the pixels of the display screen 5 are hidden, which means that the active surface of the display screen 5 is not reduced.

FIG. 2 illustrates a second embodiment of an interface module 1 according to the invention.

This embodiment differs from the one depicted in FIG. 1 in that its interface module also comprises a printed circuit 19.

Said printed circuit 19 is relatively flat, notably comprising a body made of resin that is flat, on which are placed electronic elements which are connected by conductive metallic tracks thus forming the electronic circuit.

The printed circuit 19, in order to remain invisible, is placed behind the display screen 5 in the rear housing 8b.

Such a printed circuit 19 is notably used to form an interface between the touchpad 3 and the screen 5 so as to allow them to collaborate to form a touch screen.

The interface module 1 of FIG. 2 also differs from the one depicted in FIG. 1 in that it comprises a plate 21 acting as a support, placed in the rear housing 8b. Said plate 21 is advantageously made of metal and in particular is a pressed and cut aluminum plate. To prevent galvanic corrosion with the magnesium, the plate is made of "noble aluminum". The plate 21 is positioned between the screen 5 and the casing back 13.

The plate 21 has second fixings 23, in this instance screws, fixing the display screen 5 to the metal plate 21. The metal plate 21 further comprises pressed studs 25, facing toward the rear and pressing on the printed circuit 19.

In particular, the pressed studs 25 may advantageously be positioned facing the spikes 15, so as to trap the printed circuit 19 with said spikes 15, in order to cancel any forces which may cause said printed circuit 19 to flex or to break.

The plate 21 is arranged and sized so that it is sandwiched between the periphery 7a of the exterior surround 7 and the casing-back periphery 13a of the casing back 13. In particular, the fixings 17 that hold the frontal surround 7 and the casing back 13 in place may compress these in order to hold said plate 21 in position.

If said fixings 17 comprise screws or another equivalent elongate element, said screws may advantageously pass through the plate 21, which may then have pre-drilled holes for that purpose.

The plate 21, when made of metal, allows heat produced by the elements in the rear housing 8b to be dissipated. In particular, by being in contact with the frontal surround 7, made of a metal such as magnesium, the heat is dispersed by radiation over a larger surface area.

As can be seen in FIGS. 1 and 2, the touchpad 3 is positioned in the front housing 8a formed in the exterior periphery 7a of the frontal surround 7. Advantageously, the touchpad is positioned centrally in this housing 8a so that an even gap 50 is left between the exterior periphery 52 of the touchpad and the interior face 51 of the exterior periphery 7a delimiting the housing 8a. When the polarizing film 11 covers this gap 50, this gap must not be too great. This is because in the final setup of the interface module 1, the gap 50 is covered by a polarizing film. If this gap 50 is too great, there is a risk that this polarizing film may deform in the region of this gap over the course of time. This deformation, for example in the form of sagging or blistering, would give rise to an effect that the user would find unattractive because it would reveal an undesired phantom surround between the touchpad and the magnesium surround. To solve this problem, the applicant company has determined that this gap 50 needs to be comprised in a band extending between 0.7 and 0.9 mm. For preference, the gap 50 is 0.8 mm. It is the use of a surround made of magnesium that allows this gap to be kept perfectly to this small magnitude over the entire periphery of the touchpad, and without this the problem of the deformation of the polarizing film could not be easily resolved.

FIGS. 3a, 3b and 3c show in greater detail some particular embodiments of the spikes 15 for the casing back 13 of an interface module 1 according to the invention.

FIGS. 3a, 3b, 3c depict a portion of the casing-back surface 13b with a spike 15.

In FIG. 3a, the casing-back surface 13b comprises a pip 27 protruding beyond the casing-back surface 13 in the forward direction. The spike 15 is therefore overmolded onto the pip 27, for example by injection molding of a thermoplastic elastomer (TPE). The pip 27 therefore increases the surface area of the contact between the thermoplastic and the casing-back surface 13b.

In FIG. 3b, the casing-back surface 13b comprises ribbing 29 and the spike 15 is once again obtained by overmolding, notably by injection molding thermoplastic elastomer. The ribbing 29 thus makes it possible to increase the surface area of the contact between the thermoplastic and the casing-back surface 13b.

FIG. 3c depicts a spike similar to that of FIG. 3a. Said spike 15 here also comprises flaps 31 at the periphery of its base. These flaps 31 are relatively thin layers of thermoplastic elastomer which are obtained by overmolding. Once again, the flaps 31 make it possible to increase the surface area of the contact between the thermoplastic and the casing-back surface 13b.

Furthermore, in FIGS. 3a, 3b, 3c, the spikes 15 are of trapezoidal cross section for better distribution of compressive forces and, in particular, to prevent said spikes 15 from bending or twisting.

The design of the interface module 1 according to the invention makes it possible to compensate for variations in the strings of dimensions, particularly with fixings 17 which compress the elements against the elastically deformable spikes 15.

The invention claimed is:

1. An interface module, comprising:
    a transparent touchpad, able to detect a press by a user;
    a display screen, positioned behind the touchpad and collaborating with said touchpad to form a touch screen;
    a frontal surround, said frontal surround being made of magnesium and comprising an exterior periphery and an internal rim, delimiting in the interior space of the frontal surround a front housing and a rear housing,
    wherein the touchpad is positioned inside the front housing and the display screen is positioned inside the rear housing, and
    wherein the internal rim protrudes directly from the exterior periphery and wherein the magnesium allows for the internal rim to be of a small thickness.

2. The interface module as claimed in claim 1, wherein the touchpad and the display screen are held against the internal rim by bonding.

3. The interface module as claimed in claim 2, wherein the bonding means is a bead of silicone.

4. The interface module as claimed in claim 1, wherein the thickness of the internal rim is comprised within a range extending from 0.35 to 0.5 mm.

5. The interface module as claimed in claim 4, wherein the thickness of the internal rim is 0.4 mm.

6. The interface module as claimed in claim 1, wherein there is a gap between the exterior periphery of the touchpad and the interior face of the exterior periphery and wherein the length of this gap is comprised within a range extending from 0.7 to 0.9 mm.

7. The interface module as claimed in claim 6, wherein the length of this gap is 0.8 mm.

8. The interface module as claimed in claim 1, wherein the frontal surround is electrically grounded.

9. The interface module as claimed in claim 1, wherein the touchpad is covered with a polarizing film forming the frontal surface of the interface module, said polarizing film furthermore being bonded to the periphery of the frontal surround so as to close the front housing.

10. The interface module as claimed in claim 1, further comprising a casing back, closing the rear housing and comprising deformable protrusions on a casing-back surface closing said rear housing.

11. The interface module as claimed in claim 10, further comprising fixings passing through the casing back and engaging with the periphery of the frontal surround to compress the protrusions and fix the frontal surround to the casing back.

12. The interface module as claimed in claim 11, wherein the fixings comprise self-tapping screws passing through the casing back and engaging with the periphery of the frontal surround.

13. The interface module as claimed in claim 10, further comprising a plate, arranged behind the display screen and fixed to said display screen by second fixings.

14. The interface module as claimed in claim 13, wherein the plate engages with fixings used for the casing back and the frontal surround.

15. The interface module as claimed in claim 13, further comprising a printed circuit positioned in the rear housing.

16. The interface module as claimed in claim 15, wherein the plate is positioned between the display screen and the printed circuit.

17. The interface module as claimed in claim 15, wherein the plate has pressed studs forming supports for the printed circuit.

18. The interface module as claimed in claim 13, wherein the plate is a pressed and cut aluminum plate.

19. The interface module as claimed in claim 17, wherein the pressed studs are positioned facing the protrusions of the casing back.

20. The interface module as claimed in claim 1, wherein the surface of the frontal surround is covered with a thin coat of dark lacquer.

* * * * *